Figure 1:
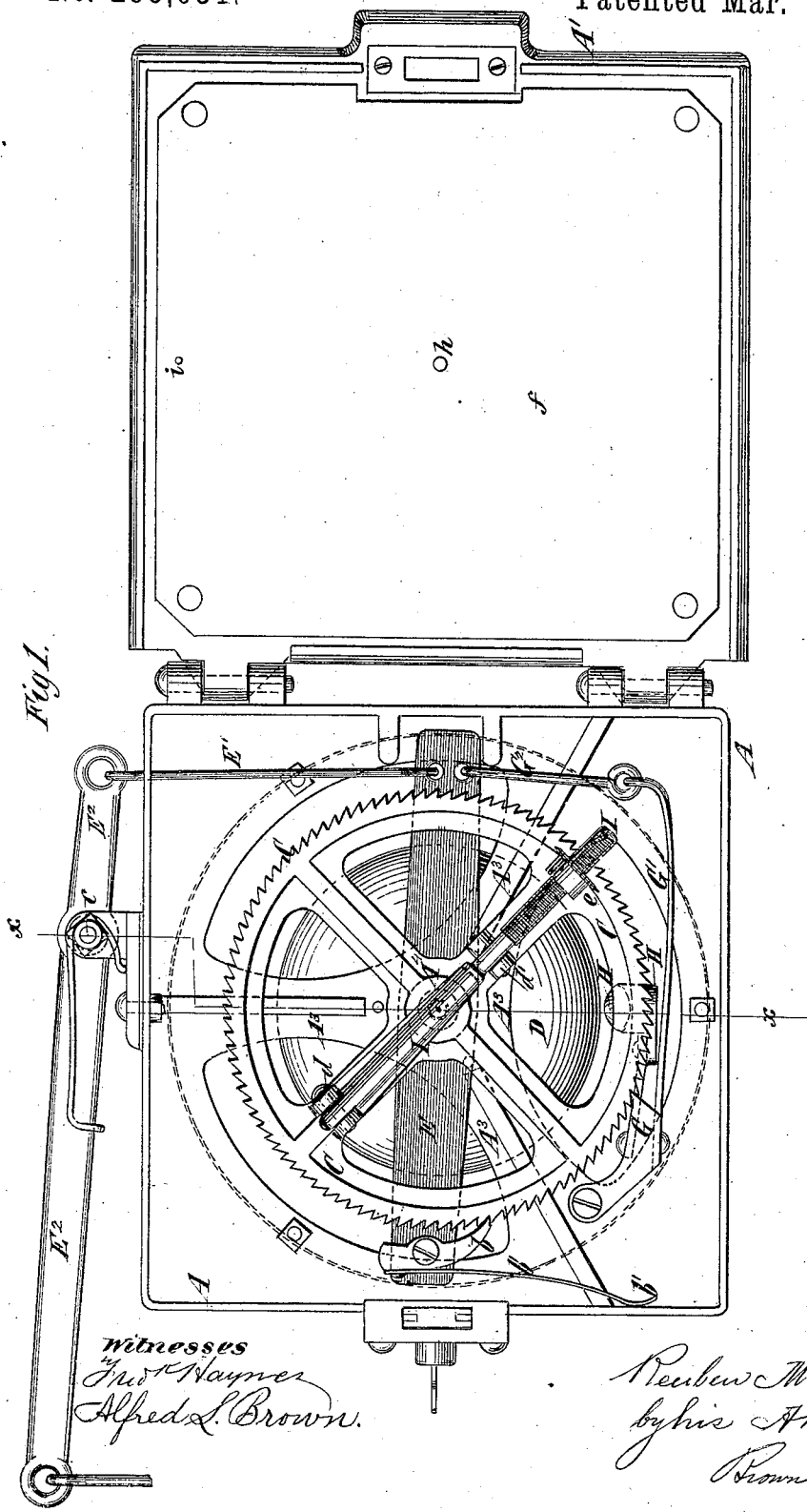

(No Model.) 2 Sheets—Sheet 1.

R. M. ROSE.
FARE REGISTER OR RECORDER.

No. 295,051. Patented Mar. 11, 1884.

Witnesses
Fred't Haymer
Alfred L. Brown.

Inventor
Reuben M. Rose
by his Attorneys
Brown & Brown (No Model.) 2 Sheets—Sheet 2.
R. M. ROSE.
FARE REGISTER OR RECORDER.
No. 295,051. Patented Mar. 11, 1884.
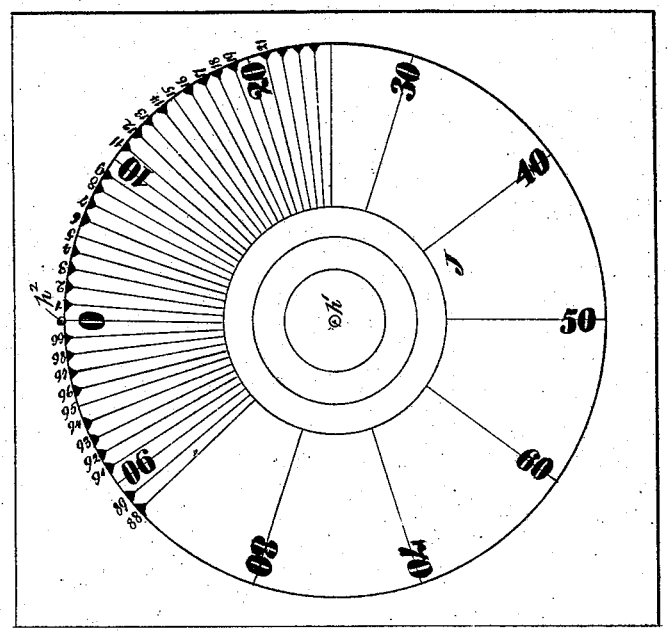
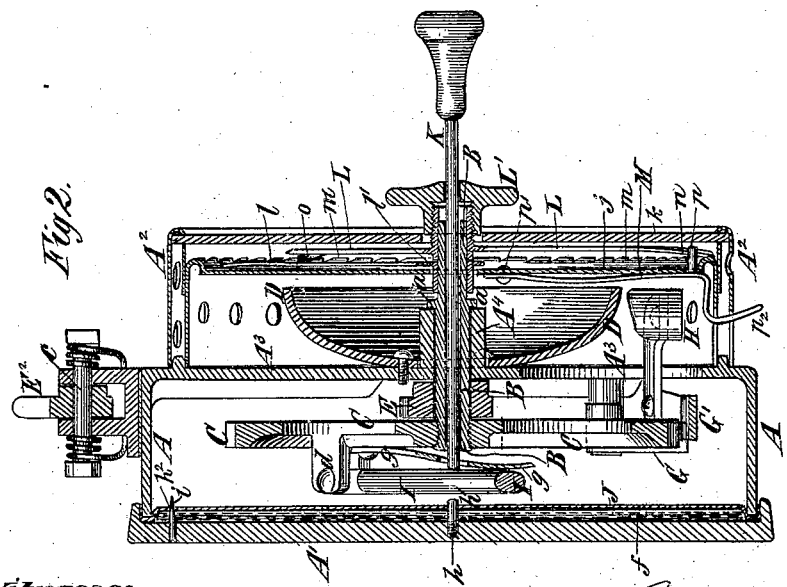

United States Patent Office.

REUBEN M. ROSE, OF BROOKLYN, NEW YORK, ASSIGNOR TO DAVID F. ATKINS, OF SAME PLACE.

FARE REGISTER OR RECORDER.

SPECIFICATION forming part of Letters Patent No. 295,051, dated March 11, 1884.

Application filed January 3, 1883. (No model.)

*To all whom it may concern:*

Be it known that I, REUBEN M. ROSE, of Brooklyn, in the county of Kings and State of New York, have invented a new and useful Improvement in Fare Registers or Indicators, of which the following is a specification.

My invention relates more particularly to fare registers or indicators of the kind shown and described in Letters Patent of the United States No. 244,314, granted to me July 12, 1881; but certain features of the invention are applicable to registers or indicators of other kinds. In the register and indicator forming the subject of the aforesaid Letters Patent, the ratchet-wheel which actuates the bell-hammer and the hand which moves over the visible dial carries a radial arm, which has a toothed wheel fitting upon it with a screw-thread. At the back of the case is a paper dial, and as the ratchet-wheel rotates step by step the toothed wheel punctures or indents the paper dial, and by its rotation is advanced on the arm, carrying it toward or from the center of the ratchet-wheel, thereby producing a continuous convolute spiral line of indentations or marks upon the paper dial.

One feature of the invention consists in the combination, in a fare register or indicator, of a concealed dial and means for recording or marking thereon, a visible dial and an index for indicating thereon, and a hollow spindle carrying said index, and serving for the passage of a rod by which the recording or marking device may be operated to cause it to register on the concealed dial. When the wheel is provided with a radial arm carrying a marking device for marking or puncturing a paper dial, I combine with the hollow spindle a pin, which may be pushed inward through the spindle against the said arm for making a heavy mark or deep indentation in the paper dial, thereby serving to indicate the termination of a half trip or change of conductors or such other stage or step in the indication as may be desired.

Another feature of the invention consists in the combination, in a fare register and indicator, of a case composed of two portions hinged together, a spindle and a marking device adapted to turn therewith, both being supported wholly by one portion of the case, a filing or indicating point on the other portion of the case, in such position that when the case is closed said point will be opposite the center of the spindle, and a paper or analogous dial provided with a hole adapted to said filing or indicating point, whereby provision is afforded for properly centering the dial relatively to the spindle when the case is opened to enable the dial to be placed in position.

Another feature of the invention consists in the combination, with the case of a register or indicator having a bridge provided with a bearing, and extending across it and dividing the case into two compartments, of a spindle fitting the bearing, a ratchet-wheel and its actuating-lever mounted on the spindle on one side of the bridge and in one of said compartments, a bell approximately concentric with said spindle and arranged on the opposite side of the bridge in the other compartment, and a bell-hammer actuated by said ratchet-wheel, and extending across or beyond the bridge to operate on the bell.

Another feature of the invention consists in the combination, with a bell-hammer and a spring for impelling it against a bell, of a pull-rod or device for operating the bell, and a connection between the said spring and pull-rod or device, whereby the force of the spring will be increased at the time the blow is struck by the bell-hammer, and the hammer-arm may be made shorter, and the hammer may have a shorter stroke.

Other features of the invention consist in details of construction and combinations of parts hereinafter described.

In the accompanying drawings, Figure 1 represents a back view of a register and indicator embodying my invention, the case being opened. Fig. 2 represents a sectional view on the plane of the dotted line *x x*, Fig. 1; and Fig. 3 represents a paper dial of the kind which I employ.

Similar letters of reference designate corresponding parts in all the figures.

A designates the body of the case, and A' designates the back to which the body is hinged, and through which the register and indicator may be secured in place.

Upon the front of the body A of the case is a projecting portion, A², which may be circular.

Across the body A of the case there extends a bridge, A³, which may be cast integral with the case, and of any suitable form. The said bridge contains a bearing, A⁴, of considerable length, and in this bearing is fitted the spindle B. The spindle B is provided with a shoulder, $a$, and on the opposite side of the bridge a ratchet-wheel, C, is secured to the spindle. The shoulder $a$ and the ratchet-wheel C prevent longitudinal movement or end-play of the spindle. The bridge A³ divides the case into two compartments.

D designates a bell secured to the bridge A³ on the opposite side from the ratchet-wheel C, and approximately concentric with the spindle B. The bell is contained in the projecting front portion, A², of the case, and one advantage of this arrangement is that a large bell can be employed.

On the back of the bridge A³, and between it and the ratchet-wheel C, is a lever, E, which fits loosely on the spindle B, and is adapted to turn freely thereon. At one end this lever carries an actuating-pawl, $b$, which is held in engagement with the teeth of the wheel C by a spring, $b'$, and to the other end of said lever is connected a pull-rod or device, E', which extends to an operating-lever, E², fulcrumed at $c$ on the exterior of the case A.

G designates a bell-pawl, which is operated by the rotation of the ratchet-wheel, and to which the hammer H is attached. This hammer extends across or beyond the bridge A³ into the compartment containing the bell to operate on the bell. The hammer-arm extends from the pawl forward through the bridge, and is adapted to act upon the bell D. From the pawl G there extends a spring, G', which is connected by a rod, G², with the end of the lever E, and through said rod and lever the spring G' is connected with the pull-rod or device E', and has its tension increased when the hammer is moved away from the bell. This enables me to gain more spring-power, and to use a shorter hammer-arm having a shorter stroke, and yet one capable of striking a very effective blow. By thus shortening the hammer-arm the vibration is diminished, and it is rendered more difficult, if not impossible, to sound the alarm without making a tally. If any attempt is made to work the pull rod or lever F, so as to vibrate the hammer without operating the registering device, the vibration will be taken up by the spring G', and does not come on the hammer. The ratchet-wheel C carries on its rear side a radial arm, I, fulcrumed at one end, $d$, and adapted to move toward and from the wheel in a guide, $d'$. Upon the outer portion of this arm is a fine screw-thread, and thereon is screwed a toothed wheel, $e$, which bears against the back A' of the case, or against a sheet, $f$, of rubber packing or other soft material secured thereon. The toothed wheel $e$ is impelled against the back of the case by a spring, $g$, applied between the arm I and wheel C, as shown in Fig. 2.

Upon the sheet of packing $f$ at the back of the case is secured a dial, J, of paper or other analogous material, and which may be printed, as partially shown in Fig. 3. This dial may be held in place by being clamped between the case A and the back plate, A', to which it is hinged. It is very important that the dial J should be set exactly concentrically with the spindle B, and to enable this to be readily done I provide the back plate, A', with a pin, $h$, which is concentric with the spindle and constitutes a filing or indicating point, and the dial with a central hole, $h'$, adapted to fit said pin. The plate A' may likewise have a second pin, $i$, and the dial a hole, $h^2$, near one edge, and by this means the dial is held squarely on the back of the case, as well as concentrically. In lieu of the pin $h$, a filing or indicating point of any other form might be provided. For instance, the filing or indicating point might consist of a hole in the back plate or a spot or recess on or in the back plate, and the dial furnished with a hole through which the filing or indicating point can be seen; or, instead of one filing or indicating point, the plate A' might have two, three, or four pins or filing or indicating points placed in any position, and the dial be provided with holes which bear the same relation to the center of the dial and to each other that the pins, filing, or indicating points bear to the center of the spindle and to each other. When the dial J is in place and the case closed, the arm I will be carried round by the wheel in its step-by-step rotation, and the toothed wheel $e$ will be rotated by contact with the paper dial. As it rotates it will turn upon the screw-threaded portion of the arm, and will move toward or from the center of the spindle, and will form in the dial a continuous spiral row or series of indentations which form a permanent record of the fares collected and rung up. This dial at the end of the day's work is to be taken out and preserved and a new dial inserted in its place.

In lieu of the toothed wheel $e$, a marker or puncturing device of any other form may be employed.

Sometimes it is desired to indicate upon the paper or other dial, J, the end of a half trip, a change in the conductor, or some other occurrence; and to enable this to be readily done I make the spindle B hollow, as best shown in Fig. 2. A pin, K, may then be introduced from the front of the instrument through the spindle, as shown in Fig. 2, and by pressing on the arm I the wheel $e$ may be deeply indented into the dial J. Even though the dial J were not used, it might be desirable in any register to make the spindle hollow for the passage of a rod, pin, or other device, or for any other purpose; and hence I consider the hollow spindle, broadly, as a feature of my invention, though I may not invariably use it, even in indicators provided with the dial J.

In the front of the part A² of the case is a visible dial, j, and a glazed front, k, through which projects the spindle B. The index-hand or pointer l has its hub or eye l' split and fitting friction-tight upon the spindle B. The index-hand or pointer will then be caused to turn with the spindle, but may be turned independently of the spindle to set it.

Upon the spindle B, in front of the index-hand or pointer l, is a setting bar or arm, L, which does not turn with the spindle, but may be turned thereon. The said bar or arm is provided, outside the glass k, with a hand-piece, L', whereby it may be turned at the end of the trip, and around the case is a rim, m, provided with ratchet-teeth, with which the tail n of the bar or arm L engages, and which precludes said bar or arm from being turned in but one direction.

Upon the bar or arm L is a projection or hook, o, which is adapted to engage with the index-hand or pointer l.

It will be understood that the index-hand or pointer l cannot be turned except by turning the bar or arm L, so as to cause the projection or hook o to carry the hand or pointer forward, and after setting the hand or pointer at zero on the dial j, the setting bar or arm remains stationary, while the hand or pointer moves away from it. The setting bar or arm, therefore, always indicates at what point the index-hand or pointer was set and started.

In order to preclude the possibility of the conductor or starter making any excuse for not setting the index-hand or pointer properly by means of the setting bar or arm L—as, for instance, that he could not see plainly—I provide a stop-pin, p, which projects outward in the path of the tail n of the said setting bar or arm, and this pin is removable, so that the bar or arm may pass it and make a complete turn at the next setting operation. As here represented, the pin p is attached to a spring-arm, M, which is secured at its inner end, p', and the outer end of which projects through an opening in the case, so as to form a hand-piece, p². At each setting operation the pin is withdrawn from in front of the bar or arm L by pressing on the hand-piece p², and then released, and the bar or arm is then moved a full turn and until its tail again strikes and is arrested by the pin p.

My register and indicator is very simple in construction, and is not liable to get out of order, and the several features of my invention all serve to increase the accuracy and convenience with which it may be operated.

What I claim as my invention, and desire to secure by Letters Patent, is—

1. In a fare register and indicator, the combination of a concealed dial and means for recording or marking thereon, a visible dial and an index for indicating thereon, and a hollow spindle carrying said index, and serving as a passage for a rod by which the recording or marking device may be operated or moved to cause it to register or mark on the concealed dial, substantially as described.

2. The combination, with a ratchet-wheel, a hollow spindle on which the wheel is mounted, and means for imparting a step-by-step rotation to the said wheel, of a dial, a radial arm carried by said wheel and provided with a marking device, and a pin adapted to be inserted through the hollow spindle to press upon the said arm, and so cause its marking device to make a deep or heavy impression on said dial, substantially as herein described.

3. In a fare register and indicator, the combination of a case composed of two portions hinged together, a spindle and a marking device adapted to turn therewith, both being supported and carried wholly by one portion of the case, a filing or indicating point on the other portion of the case in such position that when the case is closed said point will be opposite the center of the spindle, and a paper or analogous dial provided with a hole adapted to said filing or indicating point, whereby provision is afforded for properly centering the dial relatively to the spindle when the case is opened to enable the dial to be placed in position, substantially as described.

4. The combination, with the ratchet-wheel C, means for imparting to it a step-by-step rotary motion, and a radial arm provided with a marking device carried by said wheel, of the back plate, A', provided with a central gage, and the dial J, provided with a central opening, substantially as and for the purpose herein described.

5. The combination, with a fare register or indicator case having a bridge provided with a central bearing extending across it and dividing it into two compartments, of a spindle fitting the bearing, a ratchet-wheel and its actuating-lever mounted on the spindle on one side of the bridge and in one of said compartments, a bell approximately concentric with the spindle and arranged on the other side of the bridge in the other compartment, and a bell-hammer actuated by said ratchet-wheel and extending across or beyond the bridge to operate on the bell, substantially as herein described.

6. The combination, with a bell-hammer and a spring for impelling it against a bell, of a pull-rod or device for operating the bell, and a connection between the spring and pull-rod or device, whereby the force of the spring will be increased at the time the blow is struck by the hammer, substantially as and for the purpose herein described.

7. The combination, with the ratchet-wheel C and the bell-pawl G, of the spring G', connected with the bell-pawl, mechanism for imparting a step-by-step rotation to the said wheel, and a pull-rod or device connected with the said mechanism for operating it, and also connected with said spring for simultaneously increasing its force, substantially as herein described.

8. The combination of the spindle B, wheel C, lever E, pull-rod or device E', actuating-pawl b, bell D, bell-pawl G', and rod $G^2$, all arranged and adapted to operate substantially as herein described.

9. The combination, with the visible dial $j$ and hand or pointer $l$, of the setting bar or arm L, the notched rim $m$, and the removable stop-pin $p$, all arranged and adapted to operate substantially as and for the purpose herein described.

REUBEN M. ROSE.

Witnesses:
FREDK. HAYNES,
ED. L. MORAN.